United States Patent [19]
Albers, Sr.

[11] Patent Number: 4,476,815
[45] Date of Patent: Oct. 16, 1984

[54] CATTLE STANCHION APPARATUS

[76] Inventor: Teo Albers, Sr., P.O. Box 156, Artesia, Calif. 90701

[21] Appl. No.: 431,264

[22] Filed: Sep. 30, 1982

[51] Int. Cl.³ .............................................. A01K 1/06
[52] U.S. Cl. .................................. 119/147 R; 119/148
[58] Field of Search ............... 119/147 R, 147 A, 148, 119/147

[56] References Cited

U.S. PATENT DOCUMENTS

| | | | |
|---|---|---|---|
| 4,037,566 | 7/1977 | Albers | 119/147 |
| 4,314,528 | 2/1982 | Fogleman | 119/147 R |
| 4,377,131 | 3/1983 | Vandenberg et al. | 119/148 |

Primary Examiner—Hugh R. Chamblee
Attorney, Agent, or Firm—Fulwider, Patton, Rieber, Lee & Utecht

[57] ABSTRACT

Cattle stanchion apparatus in which a plurality of fixed and release stanchions define a row of head openings for animals, the release stanchions tending to pivot to open positions. Latches at the upper extremities of the release stanchions are engageable by couplers carried by a rotatable and axially movable positioner. An operating mechanism is actuable to axially move the positioner, and a locking system is actuable to rotate the positioner and thereby move the couplers into and out of a path of engagement with the latches of the release stanchions. The arrangement gives the operator the capability of moving all of the release stanchions to closed positions to lock the animals in the feeding stalls, or allowing the animals individually to actuate the system to lock themselves in, or allowing the animals to enter and leave the stalls as they wish. The locking system can be placed in a locked position to disable the operating mechanism. A variation of the locking system permits it to be locked against inadvertent movement from either its locked position or its unlocked position.

27 Claims, 18 Drawing Figures

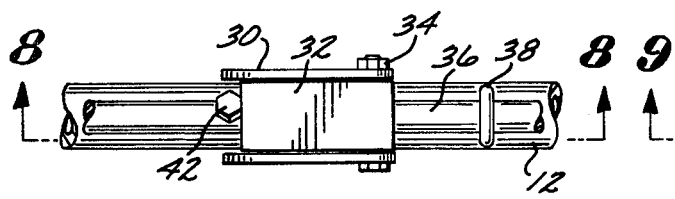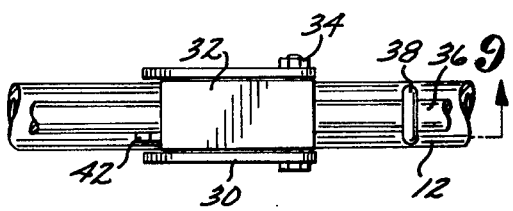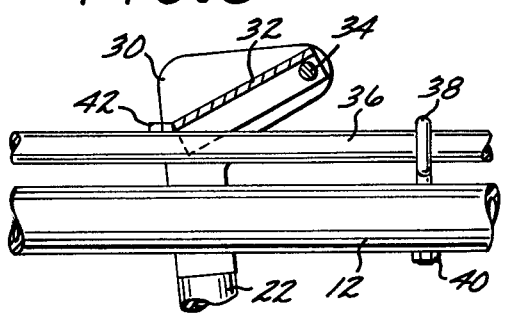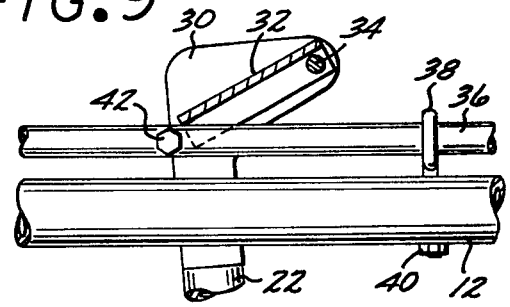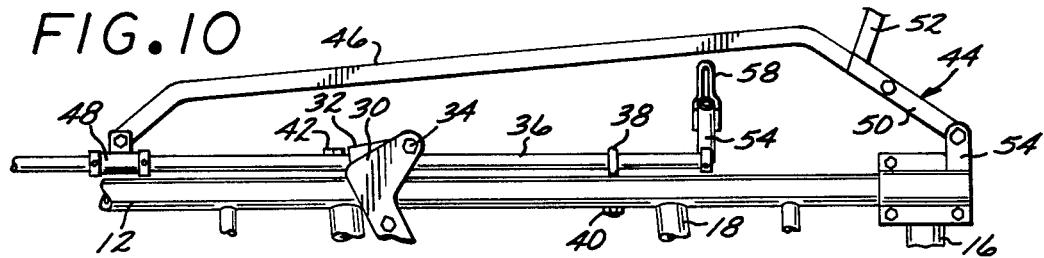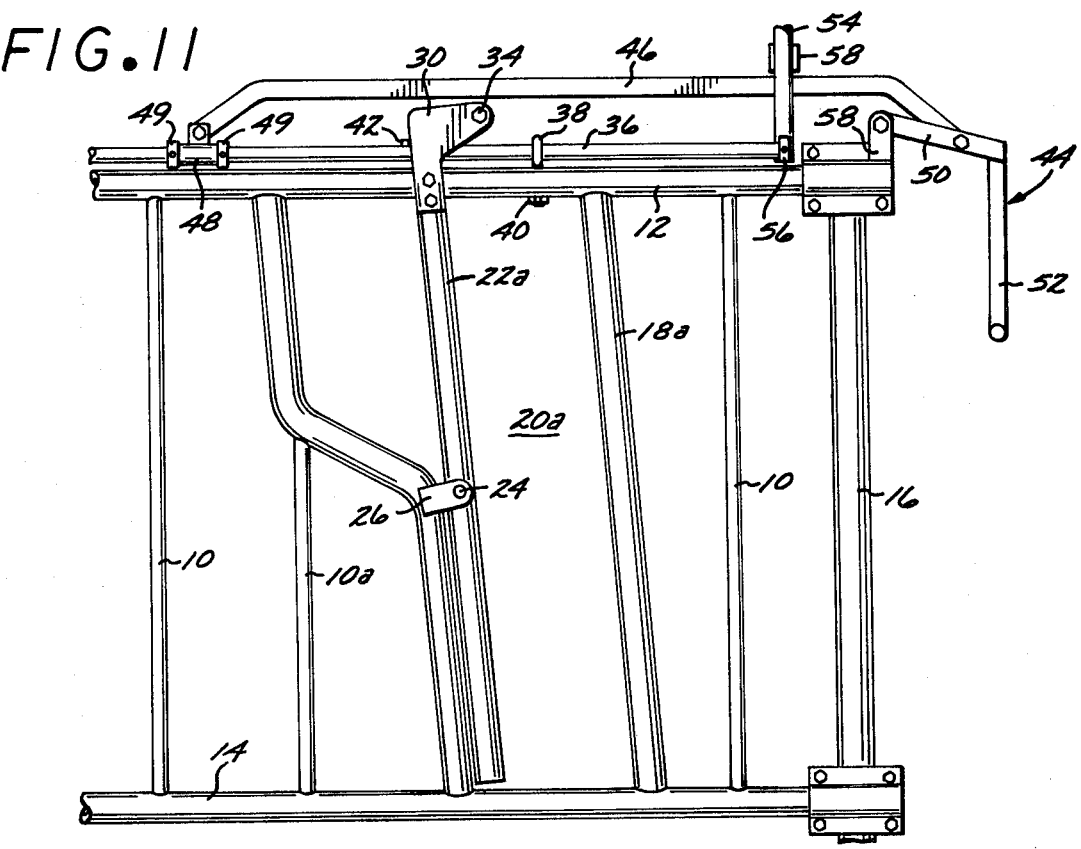

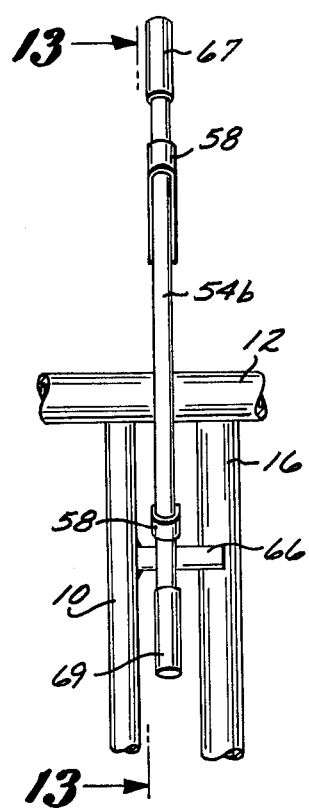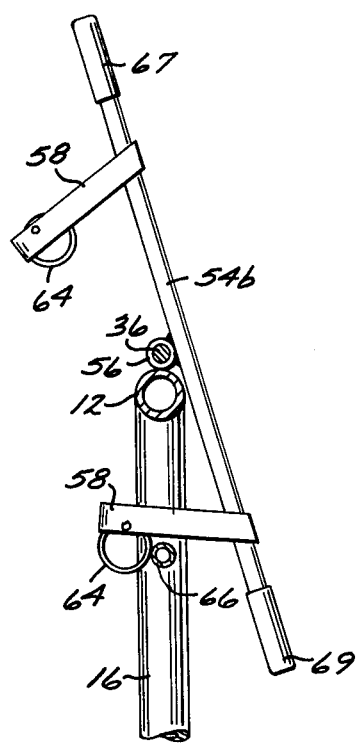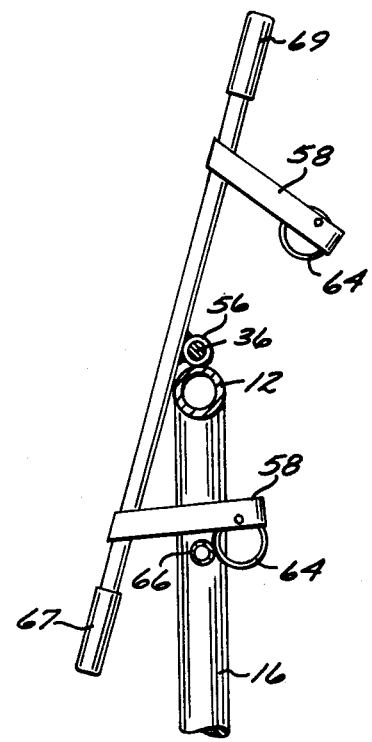
FIG.12  FIG.13  FIG.14
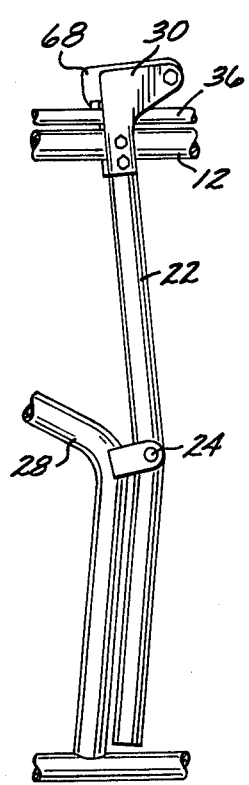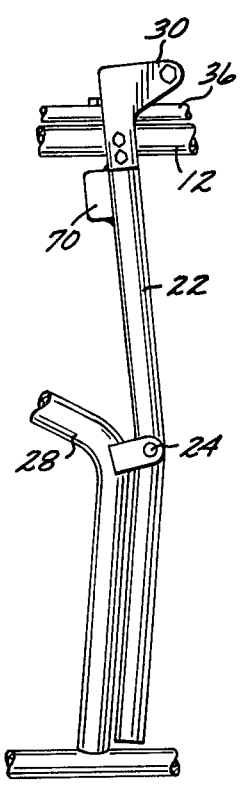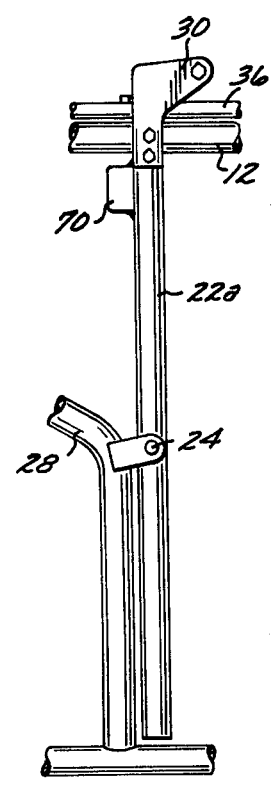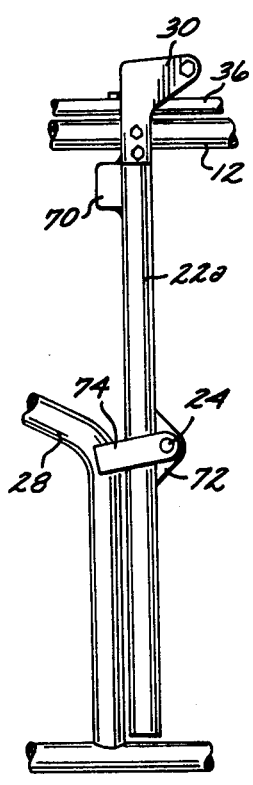
FIG.15  FIG.16  FIG.17  FIG.18

CATTLE STANCHION APPARATUS

BACKGROUND OF THE INVENTION

1. Field of the Invention

The present invention relates to cattle stanchion apparatus and more particularly to cattle stanchion apparatus capable of actuation to a cattle locking position by either the operator or by the animals themselves as they move into feeding position.

2. Description of the Prior Art

Various types of cattle stanchion apparatus are disclosed in the prior art, and particularly in my U.S. Pat. Nos. 4,037,566 issued July 26, 1977, and entitled "Cattle Locking Apparatus"; 4,051,813 issued Oct. 4, 1977, and entitled "Locking Stanchion for Cattle"; and 4,185,592 issued Jan. 29, 1980, and entitled "Cattle Stanchion release stanchions freely between open and closed positions so that they can feed or leave as they wish.

Various embodiments of the invention are directed to different means for establishing a tendency for the release stanchions to fall or move to their open positions. In addition, various forms of locking means are disclosed, including an embodiment which quickly apprises the operator of the locked or unlocked state of the locking means.

Other objects and features of the invention will become apparent from consideration of the following description taken in connection with the accompanying drawings.

Although only one fixed stanchion 18 and release stanchion 20 are illustrated, it will be understood that the arrangement is repeated at regular intervals along the length of the present apparatus to define as many head openings 20 as may be desired. Likewise, although the following disclosure is primarily limited to a description of the operation of the components for one head opening 20, it will be understood that a plurality of sets of such componenets are employed for the plurality of head openings 20, unless otherwise indicated.

Figure 1:
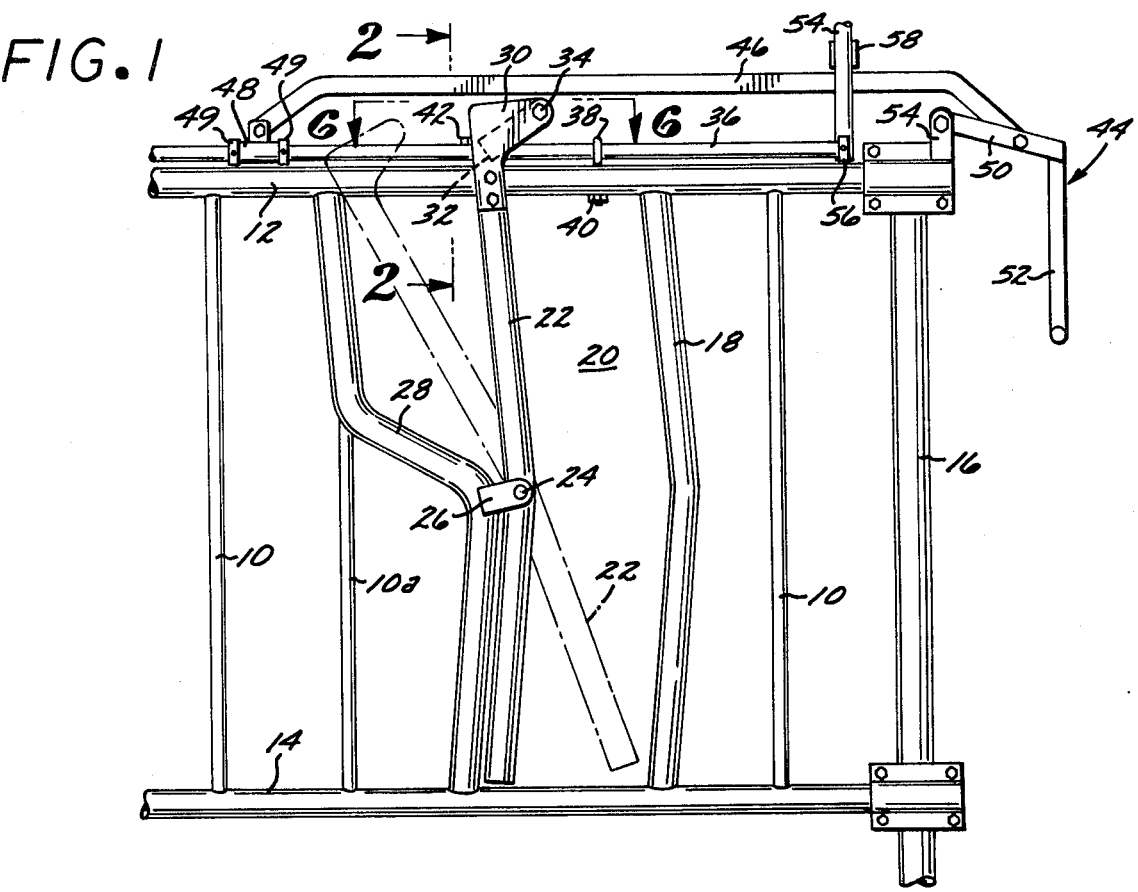
FIG. 1 is a front elevational view of one end of a cattle stanchion apparatus according to the present At horizontally spaced intervals, larger tubular fixed stanchions 18, only one of which is illustrated, are welded or otherwise rigidly secured at their upper and lower extremities to the top and bottom rails 12 and 14. The weld points are generally vertically aligned, but below its midportion the stanchion 18 is preferably bent or offset to the right, as seen in FIG. 1, so as to define with an adjacent elongated release stanchion 22 a head opening 20 of uniform width from top to bottom. The release stanchion 22 is similiarly bent or deformed to the right below its midportion.

Each release stanchion 22 is mounted for pivotal movement between a closed position, as illustrated in full line in FIG. 1, and an open position, as illustrated in phantom outline in FIG. 1. In the embodiment illustrated, the pivotal movement is about an axis located between the opposite extremities of the release stanchion, the axis being defined by a pivot bolt 24 carried by a bracket 26. The bracket 26 is welded to an angularly offset section of relatively heavy tubing 28 welded at its opposite ends to the rails 12 and 14. A partial rod 10a is welded at its lower end to the bottom rail 14 and at its upper end to the offset upper portion of the tubing 28 for support.

The offset upper portion of the tubing 28 defines an enlarged upper part of the head opening 20 when the release stanchion 22 is in the release position illustrated in phantom outline in FIG. 1.

The release stanchion 22 is preferably mounted below its midpoint so that it is heavier above the pivot bolt 24 and will therefore pivot to and remain in its open position in the absence of any other constraint. In its open position the enlarged size of the head opening 20 enables an animal to place its head through the opening 20 for feeding from a feed trough (not shown) located on the other side of the present apparatus.

When the animal places its head in the opening 20 and dips or lowers its head into the feed trough, the lower portion of the release stanchion 22 is engaged by the animal's neck and this causes the release stanchion to pivot from its open position toward its closed position. As will be seen, the present apparatus can be arranged to permit the animal to allow the release stanchion 22 to pivot to its open position when the animal raises its head, enabling the animal to leave the feeding stall without any operator intervention, or the apparatus can be arranged to lock the release stanchion in its closed position so that operator intervention is necessary in order to allow the animal to leave the feeding stall.

A latching means is mounted to the upper end of each release stanchion 22 and comprises a bracket 30 defined by a pair of spaced apart plates bolted to the stanchion 22 and straddling opposite sides of the top rail 12, as best seen in FIGS. 2 and 4–9. Sufficient clearance exists between the top rail 12 and the plates of the bracket 30 to enable the bracket 30 to move generally longitudinally relative to the rail 12 during pivotal movement of the release stanchion 22.

Figure 2:
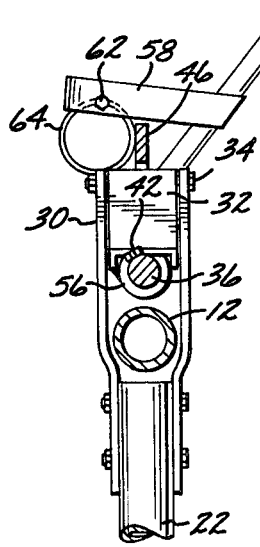

The upper portions of the plates of the bracket 30 project to the right toward the head opening 20, as seen in FIG. 2. The ends of these upper portions mount a pivot pin 34 which extends over the top of the top rail 12 and pivotally supports the right or leading extremity of an elongated, channel shape latch 32.

The opposite legs of the latch 32 straddle an elongated rod or positioner 36 which overlies and extends substantially parallel to the top rail 12. The positioner 36 also underlies the pivot pins 34 of all the release stanchions 22. The positioner 36 is rotatably and axially supported at intervals along its length by loops or eyes 38 (only one of which is illustrated) encircling the positioner 36. A threaded shank of each eye 28 extends through the top rail 12 and is held in position by a nut 40.

The positioner 36 is axially slideably movable through the eyes 38 between the extended position of FIG. 10 and the retracted position of FIG. 1.

The smooth cylindrical exterior of the rod or positioner 36 does not constrain the free or unpivoted end of the latch 32 from sliding back and forth over the positioner 36 during pivotal movement of the release stanchion 22 between its open and closed positions. However, for each head opening 20 a bolt is fixed within a suitable opening in the positioner 36 so that its projecting head defines a coupler 42 which can be engaged by the free extremity of the latch 32, depending upon the rotated and axial location of the positioner 36. Thus, if the couplers 42 are upwardly oriented and the axial position of the positioner 36 is as seen in FIG. 1, all of the release stanchions are closed, and the latches of those stanchions fall of their own weight, or are urged downwardly by suitable springs (not shown), and engage the couplers and prevent feeding cattle from opening the stanchions. On the other hand, if the axial position of the positioner 36 is as shown in FIG. 10, and the release stanchions 22 are in their open positions, movement of the positioner 36 to the right to its retracted position will cause the couplers 42 to engage the free ends of the latches 32 and urge the release stanchions 22 to their closed position, with the couplers 42 maintaining them in closed position.

An operator can move the release stanchion 22 of an individual feeding stall to an open position simply by first manually pivoting the associated latch 32 out of engagement with the coupler 42.

If the positioner 36 is in the retracted position of FIG. 1, with the couplers 42 upwardly oriented, and the release stanchions 22 in their open positions, movement of the release stanchions to their closed positions by cattle lowering their heads to feed will cause the free ends of the latches 32 to ride over and past the couplers 42, and then engage them in a reverse direction to prevent the stanchions 22 from pivoting back to their open positions.

As best seen in FIGS. 1 and 10, axial movement of the positioner 36 is effected by an operator assembly 44. This assembly 44 comprises an elongated bar 46 pivotally connected at its left end to a cylindrical sleeve 48 rotatably carried by the positioner 36 and axially fixed in position by a pair of collars 49 fixed to the positioner 36 by usual set screws (not shown) extending through the fixture 48 and bearing against the outer surface of the positioner 36. The opposite end of the bar 46 is pivotally connected between a pair of elongated links 50 integrally secured at one end to a handle 52, the other end of the links 50 being pivotally secured to an upstanding pair of straps 54 fixed to the upper rail 12. Movement of the handle 52 between the positions illustrated in FIGS. 1 and 10 axially moves the positioner 36 between retracted and extended positions.

The positioner 36 is also rotatable about its axis to move the couplers 42 into and out of a path of engagement with the latches 32. This is done by a locking means which includes an elongated locking handle 54 welded at its inner end to an annular collar 56 fixed to the positioner 36 by a usual set screw (not shown). With this arrangement, the positioner 36 can be rotated from a locked position, as seen in FIG. 2, in which the couplers 42 are generally upwardly oriented into a path for engagement with the free extremities of the latches 32; through the intermediate position illustrated in FIG. 5, in which the couplers 42 are still in an engagement path; to the unlocked position illustrated in FIG. 4, in which the couplers 42 are located out of possible engagement with the latches 32.

Figure 3:
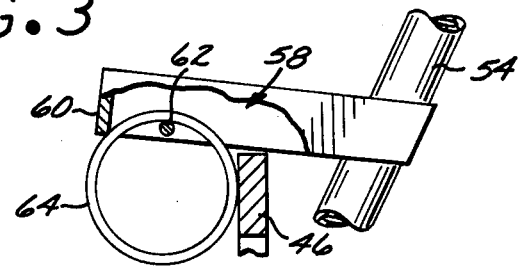

With particular reference to FIGS. 2 and 3, the locking means for rotating the positioner 36 also includes a U-shape strap 58 whose legs are welded to opposite sides of the locking handle 54. A transverse pin 62 is disposed through the strap legs adjacent the curved end wall 60 defined by the base of the U-shape strap 58. The pin 62 supports a depending locking ring 64 which, in the locked position of the handle 54 illustrated in FIGS. 2 and 3, is located between the end wall 60 and the operator bar 46. In addition, in this position the strap 58 overlies the operator bar 46 so that the operator handle 52 cannot be raised to move the positioner 36 to the left to its extended position.

The diameter of the locking ring 64 is greater than the distance between the strap end wall 60 and the adjacent operator bar 46 so that the locking handle 54 cannot be pivoted clockwise out of the locked position of FIG. 2. However, all that is necessary to enable such movement is an opposite movement of the handle 54 to increase the space between the end wall 60 and the operator bar 46 so that an individual can manually push up the ring 64 to clear the upper edge of the operator bar 46. The handle 54 is then freely moveable toward the intermediate and unlocked positions of FIGS. 5 and 4, respectively. If the handle 54 is moved back to the locked position of FIG. 2, the ring 64 rides over the operator bar 46 and drops into the position of FIG. 3 to relock the handle 54. The purpose of the intermediate position of the locking handle 54, as seen in FIG. 5, will become apparent subsequently.

In operation, and assuming that each release stanchion 22 has fallen of its own weight to the open position illustrated in phantom outline in FIG. 1, an animal entering the head opening 20 will move the release stanchion 22 to a closed position on feeding.

Figure 4:
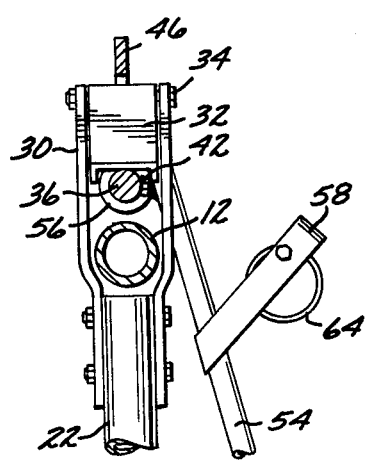
Figure 5:
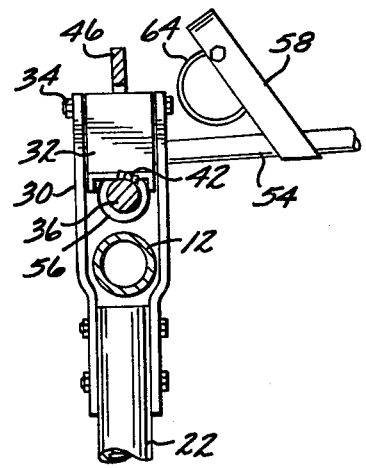

If the dairyman wants the cows to be able to freely enter and leave the feeding stalls as they like, he moves the locking handle 54 to the position of FIG. 4. This locates the couplers 42 out of possible engagement with the latches 32 and the release stanchion 22 can swing freely between its open and closed positions.

If the dairyman wants the cows to lock themselves in once they enter the feeding stalls, and again assuming that each release stanchion 22 has fallen open of its own weight, he moves the locking handle 54 to the locked position of FIG. 2, making sure that the locking ring 64 is in position to prevent inadvertent displacement of the locking handle 54 from this position. As a cow dips its head downwardly in the head opening 20, the release stanchion 22 pivots to the position of FIG. 1, and the latch 32 rides over the coupler 42 and then drops down onto the surface of the positioner 36. The latch 32 engages the coupler 42 and prevents pivotal movement of the release stanchion 22 back to its open position. The cow has thus locked itself in.

If the operator wants to close all of the feeding stalls himself and prevent cows from feeding, he moves the locking ring 64 upwardly and pivots the handle 54 to the intermediate position of FIG. 5. This moves the strap 58 out of the way of the operator bar 46 so that the operator handle 52 can be moved from the position of FIG. 1 to the position of FIG. 2, thereby moving the couplers 42 of the positioner 36 past the latches 32. Then, the operator handle 52 is moved in the opposite direction toward the retracted position of FIG. 1. The couplers 42 all engage the latches 32 and pivot all the release stanchions 22 to their closed positions.

In FIG. 11 identical numbers are used for identical parts, and letter subscripts are used to denote parts corresponding to the parts of the embodiment of FIG. 1. FIG. 11 is illustrative of cattle locking apparatus substantially identical to that of FIG. 1 except that the fixed and release stanchions 18a and 22a are straight, the release stanchion 22a is inclined to the left to promote its automatic movement to an opening position in the absence of any constraint by the positioner 36, and the fixed stanchion 18a is inclined similarly to that of the stanchion 22a so that the head opening 20a is substantially the same width from top to bottom. Such an arrangement reduces fabrication and manufacturing costs compared to that required to bend the stanchions 18 and 22 of FIG. 1.

FIGS. 12-14 illustrate a modified form of locking means, comprising an elongated handle 54b having oppositely located end grips 67 and 69 on opposite sides of the collar 56 through which the positioner 36 is disposed. The strap 58 and locking ring 64 of the first embodiment are duplicated, one being located adjacent each of the handle grips 67 and 69.

A longitudinally oriented rod 66 is welded to a stanchion rod 10 and is engageable on one side by one of the locking rings 64, and engageable on the opposite side by the other locking ring 64 during movement of the handle 54b between the positions of FIGS. 13 and 14. The locking rings enable the handle 54b to be locked against inadvertent movement out of either its locked or its unlocked positions.

In the unlocked position of FIG. 13, the grip 69 cannot be pivoted counterclockwise because of the wedging effect of the locking ring 64 between the end wall of the strap 58 and the rod 66. Slight clockwise movement of the grip 69 enables the lower ring 64 to be freed by the operator so that the handle 54b can be rotated in a counterclockwise direction to the position of FIG. 14, the opposite ring 64 riding over the rod 66 and then dropping down on the other side of the rod 66 to prevent inadvertent clockwise movement of the handle 54b. If desired, the grips 67 and 69 can be painted green and red, respectively, to immediately apprise the dairyman that the release stanchions are unlocked, or locked or susceptible of being locked.

Alternative arrangements are illustrated in FIGS. 15-18 to promote the desired automatic movement of each release stanchion 22 to its open position in the absence of any constraint presented by the couplers 42. The release stanchion 22 of FIG. 15 is identical to that of FIG. 1 except that a weighted element 68 is attached to the bracket 30 to shift the center of gravity of the stanchion 22 farther to the left of the pivot bolt 24. In FIG. 16 a similar weighted element 70 is attached to the upper portion of the stanchion 22 just below the bracket 30 for the same purpose.

The release stanchion 22a of FIG. 17 is like that of FIG. 11, except for the addition of the weighted element 70 below the bracket 30 to shift the center of gravity of the release stanchion 22a farther to the left of the pivot bolt 24. In FIG. 18 a similar weighted element 70 is attached in a similar location to the release stanchion 22a and, in addition, the pivot point of the bolt 24 is shifted to the right of the center of gravity of the stanchion 22a. This is done by utilizing a longer mounting bracket 74 attached to the tubing 28, and running the pivot bolt 24 through the bracket 74 and through a projecting tab 72 fixed to the right side of the stanchion 22a.

The arrangements of FIGS. 15-18 are all intended to promote a natural opening of the release stanchions to the full line position of FIG. 1.

From the foregoing it will be apparent that cattle stanchion apparatus has been provided which is adapted to lock cattle in feeding position. This is accomplished by locating he locking handle 54 in the lock position of FIG. 2, and orienting the couplers 42 in their upper positions. As a consequence, each animal locks itself in as it dips its head downwardly in the head opening 20.

The dairyman can allow the cattle to enter or leave the feeding stalls as they wish simply by orienting the couplers in their lower positions.

It is also an important feature of the invention that a locking means, particularly the locking rings 64 of FIG. 13, is provided to prevent the animals from engaging and moving the handle grips 67 and 69 to alter the position of the couplers 42. Without such a locking means it has been found, for example, that an animal sometimes nudges one of the grips upwardly with its head to orient the couplers 42 in their downward position, whereby locked-in animals can leave the feeding stalls, or nudges the other handle grip upwardly to orient the couplers 42 in their upward or locking positions. This could lock the animals in their stalls overnight without the dairyman's knowledge.

Although the locking rings 64 are disclosed as a preferred embodiment, it will be apparent that various other means will suggest themselves to those skilled in the art to releasably lock the handle 54 or 54b against rotation. Regardless of the structure employed, the feature of importance is provision of some locking means selectively actuable to prevent unwanted rotation of the positioner 36 which carries the couplers 42.

Another important feature of the present invention is the provision of various forms of release stanchions 22, or means for mounting the release stanchions 22, to promote automatic movement of such stanchions to their open positions when the couplers 42 are moved from their upward or locking positions. More particularly, release stanchions of the prior art are not always easily susceptible of automatic movement to an open position in the absence of constraint by couplers 42 or the like. As seen in FIGS. 1, 11, and 15-18, the present invention provides various means to impart an automatic opening movement.

In FIG. 1 the upper portion of the release stanchion is offset from the pivot bolt 24 to locate its center of gravity on the side of the pivot bolt 24 which promotes automatic opening, the complemental fixed stanchion 18 having its upper portion similarly offset.

In FIG. 11, the release and fixed stanchions 22a and 18a are both similarly inclined relative to vertical to thereby locate the center of gravity of the upper portion of the release stanchion 22a to the left of the pivot bolt 24.

The embodiments of FIGS. 15-18 accomplish the same automatic opening, but primarily through utilization of added weights to provide an overall or composite center of gravity to the left of the pivot bolt 24. In all such embodiments the automatic opening of the release stanchions 22 greatly facilitates effective operation of the cattle stanchion apparatus of the present invention.

Various modifications and changes may be made with regard to the foregoing detailed description without departing from the spirit of the invention.

I claim:

1. In cattle stanchion apparatus including a fixed stanchion; a release stanchion located adjacent and spaced from said fixed stanchion to define a head opening for an animal; and mounting means mounting said release stanchion for pivotal movement between an open position in which the upper part of said head opening is enlarged to enable an animal to place its head through said head opening, and a closed position in which said head opening is narrowed to hold the animal's head in said head opening, said release stanchion tending to fall into said open position, the improvement comprising:

generally horizontally elongated positioning means including coupler means, said positioning means being longitudinally movable between an extended and a retracted position, and pivotable about a longitudinal axis to orient said coupler means between an engage position and a non-engage position;

latching means carried at the upper extremity of said release stanchion for engaging said coupler means;

locking means operative to pivot said positioning means about said longitudinal axis; and operator means fixed against pivotal movement about said longitudinal axis and operative to move said positioning means along said longitudinal aixs between said extended position and said retracted position for engaging said latching means and said coupler means in said engage position and for moving said coupler means in said non-engage position past said latching means without engagement thereof whereby said release stanchions are not moved as a consequence of longitudinal movement of said positioning means.

2. The improvement according to claim 1 wherein said locking means is characterized by locked and unlocked positions corresponding to said engage and non-engage positions, respectively, said locking means in said locked position engaging and preventing said operator means from moving said positioning means toward said retracted position.

3. The improvement according to claim 1 and including a weight located on said latching means and tending to pivot said release stanchion to said open position.

4. The improvement according to claim 1 and including a weight located on the upper portion of said release stanchion and tending to pivot said release stanchion to said open position.

5. The improvement according to claim 1 wherein said mounting means defines a pivot axis laterally offset from said release stanchion toward said head opening to promote movement of said release stanchion toward said open position.

6. The improvement according to claim 1 wherein said release and fixed stanchions are parallel and vertically inclined to promote pivotal movement of said release stanchion to said open position.

7. The improvement according to claim 1 wherein said release stanchion is laterally offset toward said fixed stanchion adjacent the midportion of said release stanchion to promote movement of said release stanchion toward said open position.

8. The improvement according to claim 7 wherein said fixed stanchion is also laterally offset to make said head opening of the same width at the top and midportion thereof.

9. In cattle stanchion apparatus including a fixed stanchion; a release stanchion located adjacent and spaced from said fixed stanchion to define a head opening for an animal; and mounting means mounting said release stanchion for pivotal movement between an open position in which the upper part of said head opening is enlarged to enable an animal to place its head through said head opening, and a closed position in which said head opening is narrowed to hold the animal's head in said head opening, said release stanchion tending to fall into said open position; the improvement comprising:
  an elongated generally horizontally oriented positioner located adjacent said release stanchion and including a coupler;
  a latch carried at the upper extremity of said release stanchion for engaging said coupler;
  locking means operative to pivot said positioner about its longitudinal axis to move said coupler between an engage position and a non-engage position; and
  operator means fixed against pivotal movement about said longitudinal axis and operative to move said positioner along said longitudinal axis from an extended position, in which said coupler is spaced from said head opening, to a retracted position, in which said coupler is adjacent said head opening whereby, upon location of said coupler in said engage position and location of said release stanchion in said open position, said latch is engaged by said coupler for movement of said release stanchion to said closed position, and whereby, upon location of said coupler in said engage position and location of said release stanchion in said closed position, said latch is engaged by said coupler upon movement of said release stanchion to said closed position for maintaining said release stanchion in said closed position.

10. In cattle stanchion apparatus including a fixed stanchion; a release stanchion located adjacent and spaced from said fixed stanchion to define a head opening for an animal; and mounting means mounting said release stanchion for pivotal movement between an open position in which the upper part of said head opening is enlarged to enable an animal to place its head through said head opening, and a closed position in which said head opening is narrowed to hold the animal's head in said head opening, said release stanchion tending to fall into said open position; the improvement comprising:
  a generally horizontally oriented positioner located adjacent said release stanchion and including a coupler comprising a protuberance projecting out of said positioner;
  a pivotable latch carried at the upper extremity of said release stanchion for engaging said coupler and adapted to ride over said protuberance upon movement of said positioner toward said retracted position, and adapted to engage said protuberance upon movement of said positioner toward said extended position;
  locking means operative to pivot said positioner abouts its longitudinal axis to move said coupler between an engage position and a non-engage position; and
  operator means operative to move said positioner from an extended position, in which said coupler is spaced from said head opening, to a retracted position, in which said coupler is adjacent said head opening whereby, upon location of said coupler in said engage position and location of said release stanchion in said open position, said latch is engaged by said coupler for movement of said release stanchion to said closed position, and whereby, upon location of said coupler in said engage position and location of said release stanchion in said closed position, said latch is engaged by said coupler upon movement of said release stanchion to said closed position for maintaining said release stanchion in said closed position.

11. The improvement according to claim 10 wherein said latch is elongated and pivoted at that extremity which is leading during movement of said release stanchion toward said closed position.

12. The improvement according to claim 11 wherein the axis of pivotal movement of said latch is above said positioner.

13. In cattle stanchion apparatus including a fixed stanchion; a release stanchion located adjacent and spaced from said fixed stanchion to define a head opening for an animal; and mounting means mounting said release stanchion for pivotal movement between an open position in which the upper part of said head opening is enlarged to enable an animal to place its head through said head opening, and a closed position in which said head opening is narrowed to hold the animal's head in said head opening, said release stanchion tending to fall into said open position; the improvement comprising:
  a generally horizontally oriented positioner located adjacent said release stanchion and including a coupler;
  a latch carried at the upper extremity of said release stanchion for engaging said coupler;
  operator means operative to move said positioner from an extended position, in which said coupler is spaced from said head opening, to a retracted position, in which said coupler is adjacent said head opening whereby, upon location of said coupler in said engage position and location of said release stanchion in said open position, said latch is engaged by said coupler for movement of said release stanchion to said closed position, and whereby, upon location of said coupler in said engage position and location of said release stanchion in said closed position, said latch is engaged by said coupler upon movement of said release stanchion to said closed position for maintaining said release stanchion in said closed position, said operator means including an element pivotable about said positioner, means fixing said element against longitudinal movement relative to said positioner, and an elongated locking bar pivotally connected at one extremity to said element, said bar being raisable and longitudinally movable to move said positioner toward said extended position; and said locking means including a strap overlying said bar and having an end wall spaced a predetermined distance from said bar in said engage position of said coupler, said locking means further including interference means located between said end wall and said bar in said engage position, and wider than said predetermined distance, whereby said bar cannot be raised without deliberate manual movement of said interference means.

14. The improvement according to claim 13 wherein said interference means comprises a ring depending from said strap.

15. In cattle stanchion apparatus including a fixed stanchion; a release stanchion located adjacent and spaced from said fixed stanchion to define a head opening for an animal; and mounting means mounting said release stanchion for pivotal movement between an open position in which the upper part of said head opening is enlarged to enable an animal to place its head through said head opening, and a closed position in which said head opening is narrowed to hold the animal's head in said head opening, said release stanchion tending to fall into said open position; the improvement comprising:

a generally horizontally oriented positioner located adjacent said release stanchion and including a coupler;

a latch carried at the upper extremity of said release stanchion for engaging said coupler;

a stop member;

locking means operative to pivot said positioner about its longitudinal axis to move said coupler between an engage position and a non-engage position; and operator means fixed against pivotal movement about said longitudinal axis and operative to move said positioner along said longitudinal axis from an extended position, in which said coupler is spaced from said head opening, to a retracted position, in which said coupler is adjacent said head opening whereby, upon location of said coupler in said engage position and location of said release stanchion in said open position, said latch is engaged by said coupler for movement of said release stanchion to said closed position, and whereby, upon location of said coupler in said engage position and location of said release stanchion in said closed position, said latch is engaged by said coupler upon movement of said release stanchion to said closed position for maintaining said release stanchion in said closed position, said locking means including a strap having an end wall spaced a predetermined distance from said stop member in said engage position of said coupler, said locking means further including interference means located between said end wall and said stop member in said engage position, and wider than said predetermined distance, whereby said strap cannot be moved relative to said stop member without deliberate manual movement of said interference means.

16. The improvement according to claim 15 wherein said locking means includes a second said strap and a second said intereference means located adjacent said stop member in said non-engage position whereby said second strap cannot be moved relative to said stop member without deliberate manual movement of said second interference means.

17. The improvement according to claim 15 wherein said interference means comprises a ring depending from said strap.

18. In cattle stanchion apparatus including fixed structure; a fixed stanchion fixed to said fixed structure; a release stanchion located adjacent and spaced from said fixed stanchion to define a head opening for an animal; and mounting means mounting said release stanchion for pivotal movement between an open position in which the upper part of said head opening is enlarged to enable an animal to place its head through said head opening, and a closed position in which said head opening is narrowed to hold the animal's head in said head opening, the improvement comprising:

generally horizontally elongated positioning means including coupler means pivotable about a longitudinal axis to orient said coupler means between an engage position for engagement with said release stanchion and a non-engage position out of possible engagement with said release stanchion;

operator means fixed to said fixed structure and thereby constrained against pivotal movement about said longitudinal axis, said operator means being operative to move said positioning means along said longitudinal axis; and locking means operative to pivot said positioning means about said longitudinal axis; said locking means including interference means selectively operable to engage said operator means and prevent operating of said locking means and thereby preventing pivoting of said positioning means about said longitudinal axis.

19. In cattle stanchion apparatus including fixed structure; a fixed stanchion fixed to said fixed structure; a release stanchion located adjacent and spaced from said fixed stanchion to define a head opening for an animal; and mounting means mounting said release stanchion for pivotal movement between an open position in which the upper part of said head opening is enlarged to enable an animal to place its head through said head opening, and a closed position in which said head opening is narrowed to hold the animal's head in said head opening, the improvement comprising:

generally horizontally elongated positioning means including coupler means pivotable about a longitudinal axis to orient said coupler means between an engage position for engagement with said release stanchion and a non-engage position out of possible engagement with said release stanchion; and locking means operative to pivot said positioning means about said longitudinal axis; said locking means including interference means selectively operable to prevent operating of said locking means and thereby preventing pivoting of said positioning means about said longitudinal axis, said locking means including a strap adjacent said fixed structure and having an end wall spaced a predetermined distance from said fixed structure in said engage position of said coupler, said interference means being located between said end wall and said fixed structure in said engage position, and wider than said predetermined distance, whereby said strap cannot be raised for pivoting said positioning means without deliberate manual movement of said interference means.

20. The improvement according to claim 19 wherein said interference means comprises a ring depending from said strap.

21. The improvement according to claim 19 wherein said locking means includes a second said strap and a second said interference means located adjacent said fixed structure in said non-engage position whereby said second strap cannot be moved relative to said fixed structure without deliberate manual movement of said second interference means.

22. In cattle stanchion apparatus including a fixed stanchion and a release stanchion pivotally mounted between its upper and lower extremities and located adjacent and spaced from said fixed stanchion to define a head opening for an animal, improved means enabling automatic pivotal movement of said release stanchion from a closed position to an open position in which the upper part of said head opening is enlarged to enable an animal to place its head through said head opening, said improved means comprising:

means on said release stanchion locating the center of gravity of said release stanchion, in said closed position, on the side of its pivot axis remote from said head opening.

23. The improvement according to claim 22 wherein said means comprises means defining and locating said pivot axis laterally inwardly of said release stanchion in a direction toward said head opening to promote movement of said release stanchion toward said open position.

24. The improvement according to claim 22 wherein said means comprises means mounting said release stanchion in vertically inclined relation to promote pivotal movement of said release stanchion from said closed position to said open position.

25. The improvement according to claim 24 wherein said fixed stanchion is similarly vertically inclined whereby it is parallel to said release stanchion in said closed position.

26. The improvement according to claim 22 wherein said means on said release stanchion comprises a lateral offset, in a direction away from said fixed stanchion, of a portion of said release stanchion above said pivot axis to promote movement of said release stanchion toward said open position.

27. The improvement according to claim 26 wherein an upper portion of said fixed stanchion is laterally offset toward said release stanchion to make said head opening of the same width at the top and midportion thereof in said closed position.

* * * * *